United States Patent [19]
Belk

[11] Patent Number: 5,682,237
[45] Date of Patent: Oct. 28, 1997

[54] FIBER STRAIN SENSOR AND SYSTEM INCLUDING ONE INTRINSIC AND ONE EXTRINSIC FABRY-PEROT INTERFEROMETER

[75] Inventor: John Huntley Belk, St. Louis, Mo.

[73] Assignee: McDonnell Douglas, St. Louis, Mo.

[21] Appl. No.: 451,551

[22] Filed: May 26, 1995

[51] Int. Cl.$^6$ ........................ G01B 9/02
[52] U.S. Cl. ............ 356/345; 356/35.5; 356/352
[58] Field of Search ........................ 356/352, 345, 356/35.5; 385/12, 14; 250/227.19, 227.27

[56] References Cited

U.S. PATENT DOCUMENTS

| | | | |
|---|---|---|---|
| 4,452,533 | 6/1984 | Miles et al. | 356/352 |
| 4,525,067 | 6/1985 | Hernandez | 356/352 |
| 4,627,728 | 12/1986 | Willson | 356/352 |
| 4,994,791 | 2/1991 | Taylor | 356/352 |
| 5,062,684 | 11/1991 | Clayton et al. | 356/352 |

FOREIGN PATENT DOCUMENTS

| 4223625 | 1/1994 | Germany | 356/352 |
|---|---|---|---|

Primary Examiner—Samuel A. Turner
Attorney, Agent, or Firm—Dale B. Halling

[57] ABSTRACT

A strain sensor (50) combines an intrinsic Fabry-Perot interferometer (IFPI) (60) with an extrinsic Fabry-Perot interferometer (EFPI) (56, 62). The IFPI (60) is between two EFPIs (56, 62) and shares its two air to glass minors (58, 62). The outside edges (54, 66) of the two EFPIs (56, 64) are connected to an optical fiber (52). The strain sensor (164) can be implemented on a semiconductor chip (150). A waveguide (156) on the semiconductor chip (150) is etched to form two blocks (158) with an island section (162) between them. The two blocks (158) form the EFPI and the center section (162) forms the IFPI. A strain measurement system (100) that takes advantage of the strain sensor (50) has a laser (102) coupled to a optical fiber (106) containing one or more strain sensors (108). A coupler (104) directs the reflected light from the sensors (108) to a tunable Fabry-Perot etalon (114). The output of the tunable Fabry-Perot etalon (114) is coupled to a photodetector (116). A controller (118) monitors the output of the photodetector (116) and controls the tunable Fabry-Perot etalon (114).

26 Claims, 5 Drawing Sheets

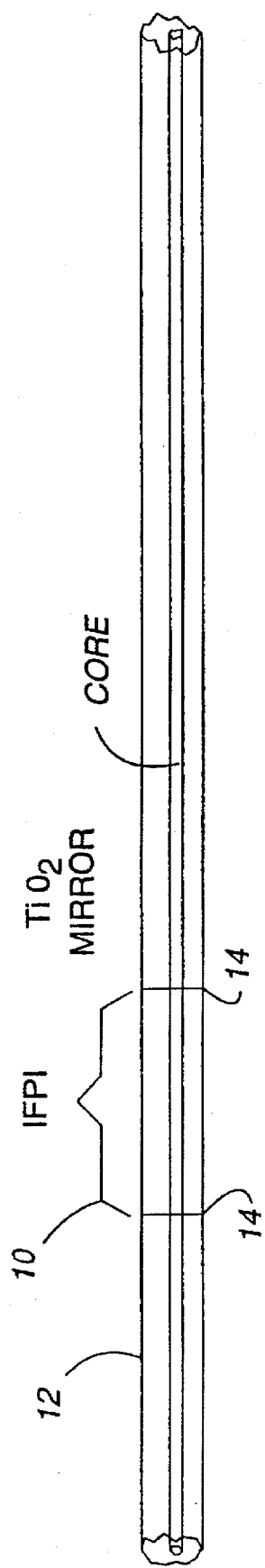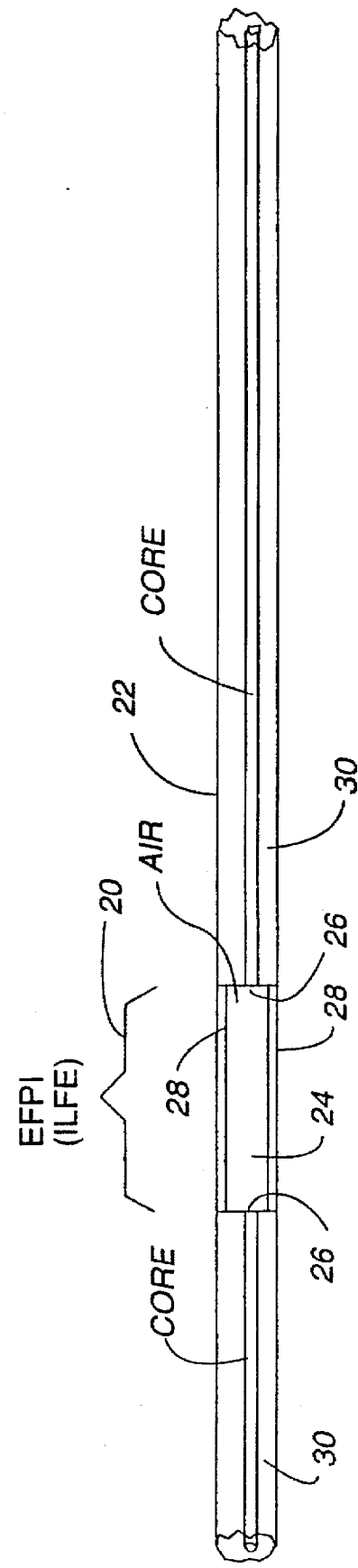

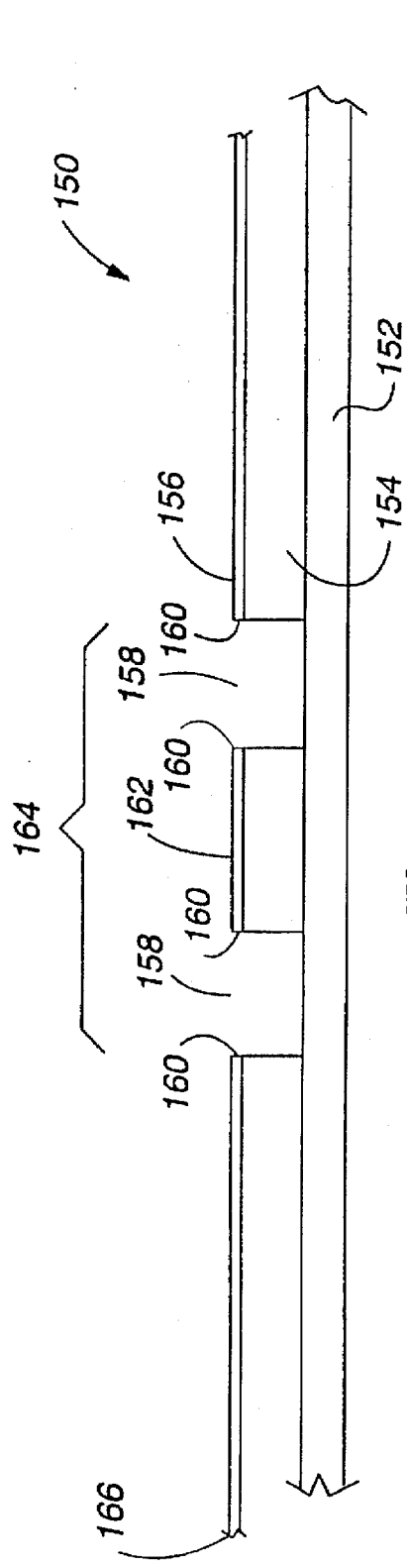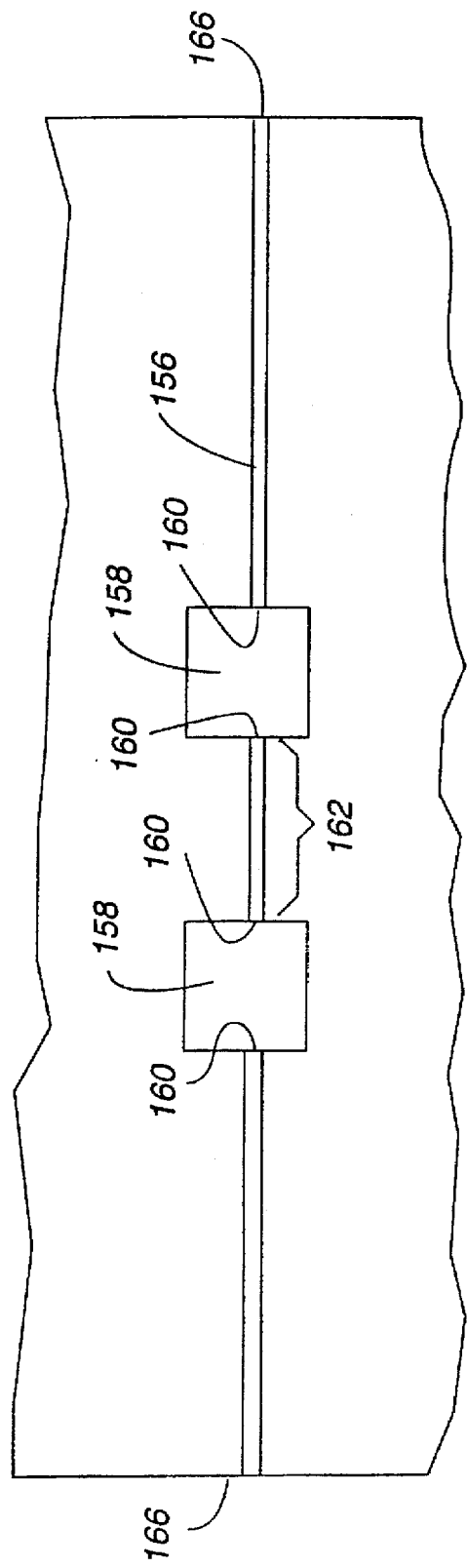

FIBER STRAIN SENSOR AND SYSTEM INCLUDING ONE INTRINSIC AND ONE EXTRINSIC FABRY-PEROT INTERFEROMETER

The Government has rights in this invention pursuant to Contract No. MDA972-90-C-0026 awarded by the United States Navy.

FIELD OF THE INVENTION

The present invention relates generally to strain sensors and systems and more particularly optical strain sensors and systems.

BACKGROUND OF THE INVENTION

The invention of the laser and optical fiber opened up a totally new way for engineers and scientists to measure strain. An optical strain sensor is usually composed of a Fabry-Perot interferometer. A Fabry-Perot interferometer (etalon) is nothing more than two parallel mirrors at a predetermined distance from each other. The mirrors form a resonant cavity, with the preferred resonant modes being integer multiples of two times the distance between the mirrors. If a light source is directed at one of the mirrors only the preferred modes (or wavelengths) of light will be transmitted by the Fabry-Perot interferometer. All other wavelengths will be reflected back to the source. Thus, it is possible to change the transmitted wavelength by changing the distance between the mirrors of a Fabry-Perot interferometer. When a Fabry-Perot interferometer is combined with coherent light source (i.e., a laser) the wavelength of the transmitted light is highly sensitive to very small changes in the distance between the mirrors. These small changes in distance can be converted to strain by knowing the properties of the material undergoing the strain.

In practice most systems detect the reflected light instead of the transmitted light. The reason for this is that for the above system to work effectively the Fabry-Perot optical cavity (path) length (i.e., the distance between the mirrors multiplied by the index of refraction of the medium between the mirrors) has to be tens of microns. This is difficult to achieve in the real world. As a result, most practical systems have a tunable Fabry-Perot etalon in the reflected path, just before the detector. When the tunable Fabry-Perot etalon and the sensor Fabry-Perot interferometer have equal optical path lengths, a Michelson interferometer exists with equal optical path lengths producing an interference pattern. The Michelson interferometer's optical paths are: 1) the second mirror of the sensor and the first mirror of the tunable Fabry-Perot etalon and 2) the first mirror of the sensor and the second mirror of the Fabry-Perot etalon. When the optical path lengths are not equal, the degree of interference is reduced and the detector sees less light until such path difference that the interference is totally destructive and the detector sees no light. The maximum distance the optical path lengths can differ and still result in the detector having an output is dependent on the coherence of the light source. A more coherent the source has a larger maximum distance.

Two types of Fabry-Perot interferometers have been used as strain sensors in the past. Both Fabry-Perot interferometers are made from optical fiber. An Intrinsic Fabry-Perot Interferometer (IFPI) 10, is shown in FIG. 1. The IFPI 10 is created by splicing an optical fiber 12 in two spots, and fabricating a mirror 14, at both splices. The optical fiber 12 is then reconnected producing the IFPI 10. IFPIs suffer from several disadvantages: 1) IFPIs are sensitive to temperature changes, 2) IFPIs are sensitive to non-axial strain and 3) IFPIs are lossy due to the scattering of the reflective coating.

The other type of Fabry-Perot interferometer is an Extrinsic Fabry-Perot Interferometer (EFPI) 20, shown in FIG. 2. The EFPI 20 is fabricated by splicing an optical fiber 22, and reassembling the optical fiber 22 so an air gap 24 exists between the ends 26 of the fiber 22. The glass to air boundaries 26 are reflective surfaces and act as mirrors for the EFPI 20. A special type of EFPI 20 is in-Line Fabry etalon (ILFE). The ILFE has capillaries 28, that are in line with the outer edge of the cladding 30 of the optical fiber 20. EFPIs are not sensitive to temperature and also are not lossy. However, EFPIs cannot be used to determine non-axial strain and EFPIs are subject to misalignment of the mirrors 26 that makes them less rugged than IFPIs.

Thus there exists a need for optical strain sensor that is not sensitive to temperature, can differentiate between on-axis and off-axis strain and is energy efficient (not lossy).

SUMMARY OF THE INVENTION

An improved optical strain sensor that overcomes these problems includes an IFPI coupled to an EFPI. In a preferred embodiment, the IFPI and the EFPI share a mirror. In an alternative embodiment, the IFPI is adjacent to and between two EFPIs. In another embodiment, the optical strain sensor is formed on a semiconductor chip.

A strain measurement system that employs the novel optical strain sensor includes, a coherent light source, a device for measuring the intensity of light, a waveguide coupling the optical strain sensor to the coherent light source and to the device for measuring the intensity of light.

BRIEF DESCRIPTION OF THE DRAWINGS

FIG. 1 is a schematic drawing of an intrinsic Fabry-Perot interferometer;

FIG. 2 is a schematic drawing of an extrinsic Fabry-Perot interferometer;

FIG. 8 is a sectional view of a semiconductor chip optical strain sensor;

FIG. 9 is a top view of the semiconductor chip optical strain sensor of FIG. 8.

DETAILED DESCRIPTION OF THE DRAWINGS

Figure 3:
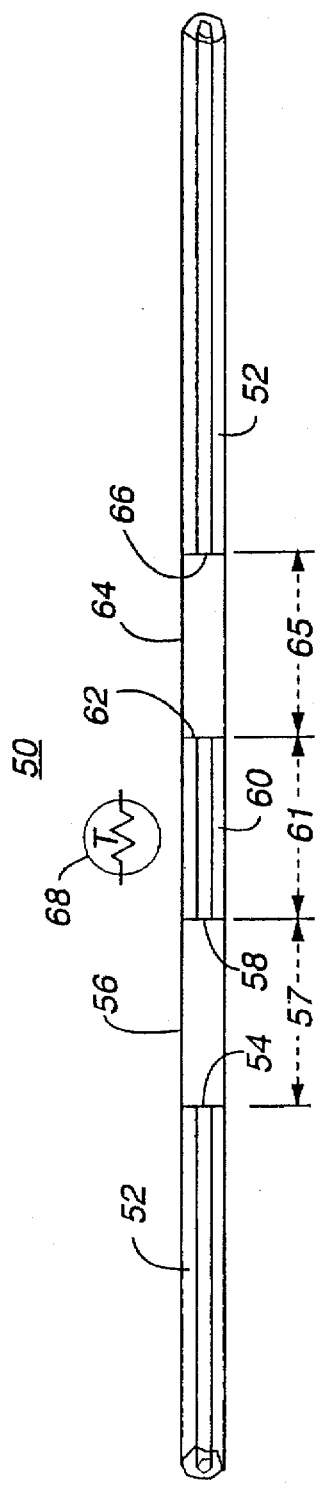
FIG. 3 is a schematic drawing of an optical strain sensor.

An optical strain sensor 50 that overcomes the problems of the prior art is shown in FIG. 3. The optical strain sensor 50 has an optical fiber (or waveguide) 52, connected to one end 54 of a first extrinsic Fabry-Perot interferometer (EFPI) 56. The other end 58 of the first EFPI 56 is connected to an intrinsic Fabry-Perot interferometer (IFPI) 60. The first EFPI 56 and the IFPI 60 share a mirror 58 that is formed by the air to glass boundary. The other end 62 of the IFPI 60 is connected to a second EFPI 64. The IFPI 60 and the second EFPI 64 share a mirror 62, also formed from an air to glass boundary. The other end 66 of the second EFPI 64 is connected to the optical fiber 52, thus forming an air to glass mirror. Optionally, the optical strain sensor 50 might include a temperature sensor 68. The temperature sensor 68 could be a thermistor, but more likely would be an optical temperature sensor. If an optical temperature sensor were used it would probably be spliced into the optical fiber 52. Normally, the optical path lengths 57, 61, 65 of the Fabry-Perot interferometers 56, 60, 64 are all different. (Optical path length is the axial physical distance times the index of refraction of the medium in which the light is traveling.) Varying the optical path lengths makes it possible for the system in FIG. 7 to detect the interferometers individually.

The optical strain sensor 50 is energy (light) efficient since all the mirrors are air to glass mirrors, that inherently have low scattering. Also the three interferometers share two common mirrors, which reduces the total number of mirrors by two. By combining the EFPIs 56, 64 and the IFPI 60, three different strain measurements can be taken at essentially the same point. Since the strain measurements from EFPIs 56, 64 are independent of temperature and non-axial strain, both the axial strain and the non-axial strain can be determined. If a temperature measurement is available the strain measurement can be adjusted for the temperature induced strain.

Figure 4:
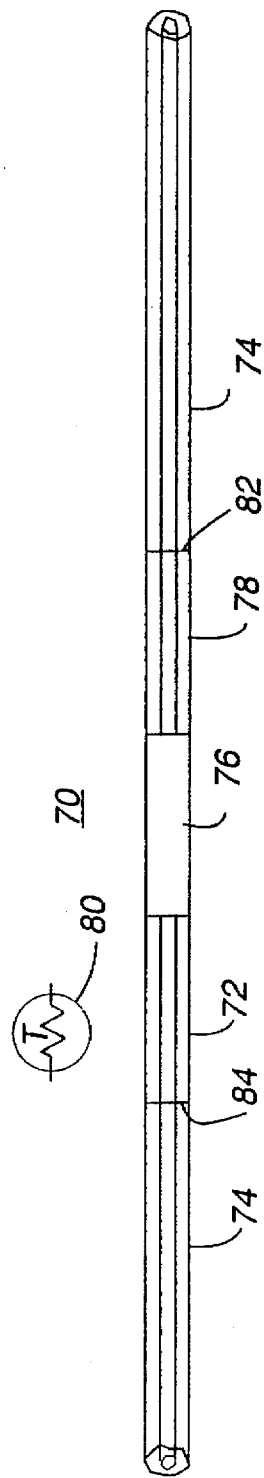
FIG. 4 is a schematic drawing of a second optical strain sensor.

FIG. 4 shows a different optical strain sensor 70. The optical strain sensor 70 has a first IFPI 72 connected to an optical fiber 74. The first IFPI 72 is also connected to an EFPI 76, which in turn is connected to a second IFPI 78. The second IFPI 78 is then connected to the optical fiber 74. The optical strain sensor 70 may also include a temperature sensor 80. This optical strain sensor 70 has some of the advantages of the optical strain sensor 50, in FIG. 3. However, it has a pair of mirrors 82, 84 that are not the result of a glass to air boundary. The material used for the pair of mirrors 82, 84 is likely to result in greater scattering of light than an air-glass mirror. As a result, the optical strain sensor 70 of FIG. 4 is likely to be more lossy than the optical strain sensor 50 of FIG. 3.

Figure 5:
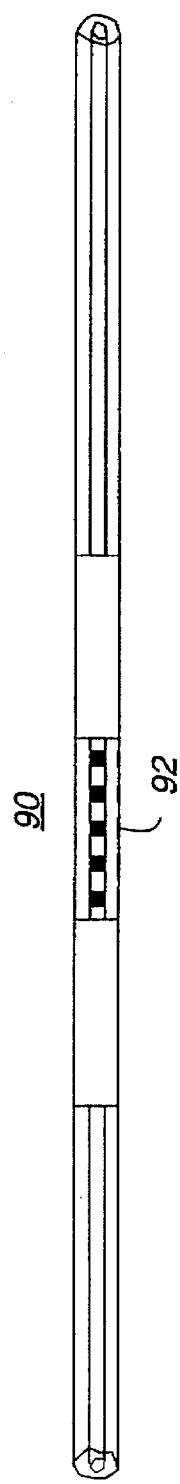
FIG. 5 is a schematic drawing of a third optical strain sensor.

FIG. 5 shows an alternative design for an optical strain sensor 90. This optical strain sensor 90 differs from the optical strain sensor 50 of FIG. 3 in that the IFPI 60 is replaced with a Bragg grating 92. The Bragg grating 92 has an index of refraction that varies along the length of the Bragg grating 92. This variation in the index of refraction is depicted as alternating shading.

Figure 6:
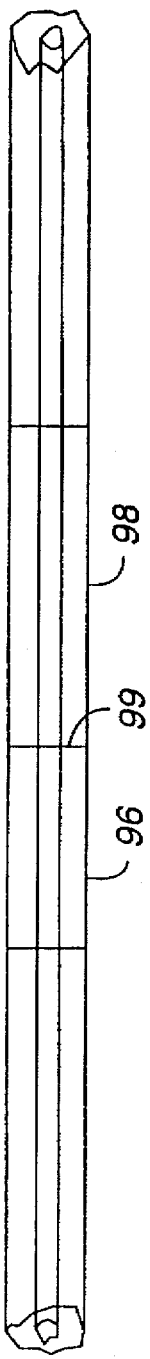
FIG. 6 is a schematic drawing of a fourth optical strain sensor.

FIG. 6 shows another alternative design for an optical sensor 94. The sensor 94 has a first IFPI 96 butted against a second IFPI 98. The first and second IFPIs 96, 98 share a common mirror 99. Sharing the common mirror 99 makes this sensor more energy efficient than two IFPIs that do not share a common mirror. In addition the mirror can be formed by having the first IFPI 96 have a different index of refraction than the second IFPI 98. This would reduce the scattering making the sensor 94 even more efficient. Of course the idea can be expanded so that all the mirrors are formed by changes in the index of refraction. Additionally, three IFPIs could be used to form the sensor. This has the advantage of providing more data points so that the axial strain can be separated from the non-axial strain.

Figure 7:
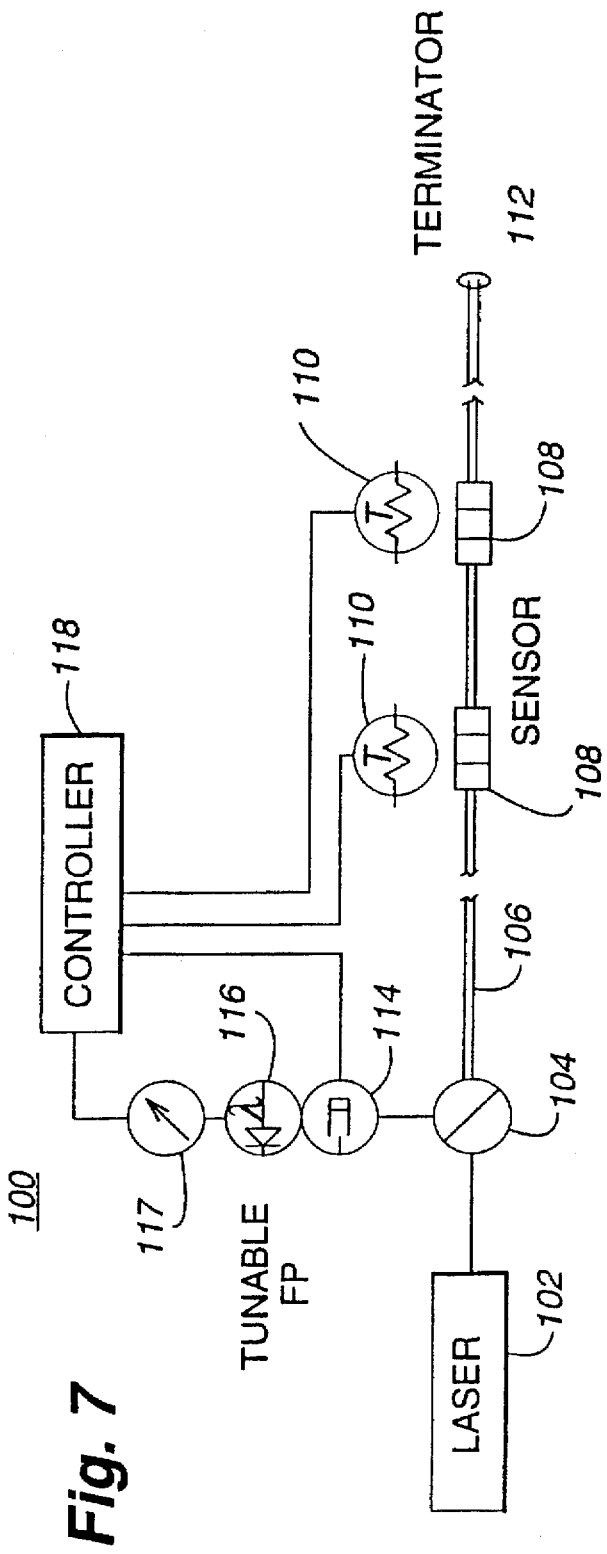
FIG. 7 is a block diagram of a strain measurement system.

FIG. 7 is a drawing of an optical strain sensor system 100, designed to take advantage of the optical strain sensors 50, 70, 90 described above. A laser (coherent light source) 102 directs its beam at a coupler 104. The coupler 104, which acts as a beamsplitter, is connected to an optical fiber 106. The optical fiber 106 typically has a number of sensors 108 along its path. The sensors 108 may include temperature sensors 110. At the end of the optical fiber 106 is a terminator 112. The terminator 112 is designed to absorb all the light that reaches it. The terminator 112 can be a sophisticated as an index matching gel or as simple as a crushing the end of the optical fiber 106.

The laser light is reflected off the mirrors of the strain sensors 108 and back to the coupler 104. The light then meets a tunable Fabry-Perot etalon 114. Next, the light is detected by a photodetector 116 and a voltmeter 117 measures the output voltage of the photodetector 116. A controller 118 is connected to, the voltmeter 117, the tunable Fabry-Perot etalon 114 and the temperature sensors 110. The controller 118 could also be connected to the laser 102. As explained in the background section, the interferometers of the sensors 108 and the tunable Fabry-Perot etalon form a Michelson interferometer. When the tunable Fabry-Perot etalon 114 has the same optical path length as that of one of the interferometers in the sensors 108, an equal optical path length condition exists in the Michelson interferometer and an interference pattern forms on the photodetector 116. The photodetector's 116 voltage changes and this change is measured by the voltmeter 117. Alternatively, the controller can directly monitor the output voltage of the photodetector 116. The optical path differential that can occur and still produce a detectable interference pattern is dependent on the coherence of the light source.

The controller 118 controls the tunable Fabry-Perot etalon 114 and as a result knows the optical path length of the tunable Fabry-Perot etalon 114. The controller measures the optical path length of each of the interferometers in the sensors 108 before the sensors 108 have any strain applied to them. The controller 118 stores these path lengths for future reference. Then the controller 118 adjusts the tunable Fabry-Perot etalon 116 to find each interferometer after stress has been applied to the sensors 108. The difference in the optical path lengths in the interferometers is due to the applied strain. This difference in optical path length is then converted to a physical distance. The physical distance can be converted into a strain by knowing the properties of the material undergoing the strain. Using the optical strain sensors 50, 70, 90 described above the controller can determine both the axial strain and the non-axial strain. The EFPIs can only measure axial strain, while the IFPI measures both axial strain and non-axial strain. By subtracting the axial strain measured by the EFPIs from the measured strain of the IFPI, the non-axial strain is found.

The system of FIG. 7 can be implement with the photodetector 116 and tunable Fabry-Perot etalon 114 at the opposite end of the optical fiber 106 as the laser 102. This alternative system embodiment works best with the sensor 90 of FIG. 5. In this alternative the interferometers (or Bragg gratings) act as notch filters. The photodetector detects a drop in the optical intensity at the wavelengths the interferometer's filter. The wavelengths that are filtered are dependent on the optical path length of the interferometer, which changes with strain. Thus, a transmit sensing strain measuring system can be designed.

The sensors shown in FIGS. 3–6 and the strain measurement system of FIG. 7 can be implemented on a semiconductor chip using microphotonic techniques. A brief description of how to implement the strain sensor 50 of FIG. 3 on a semiconductor chip will be described with reference to FIGS. 8 and 9. A semiconductor chip 150 has a substrate 152 of GaAs or similar material (GaAlAs, InGaAs). On top of the substrate 152 an epitaxial layer 154 is grown. The epitaxial layer 154 is composed of a material that allows a waveguide 156 to be formed in the top surface of the epitaxial layer 154.

The waveguide 156 can be formed by stressing the thin region 156, for instance by an e-beam, or the waveguide can be formed by doping the thin region 156 with impurities. Next, two blocks 158 are etched out of the waveguide 156. The etched surfaces 160 form air to waveguide mirrors, that are similar to the air to glass mirrors in FIG. 3. These mirrors 160 can be coated to optimize their reflectance. The blocks 158 then behave like behaves like he center section 162 behaves like an IFPI. In addition, if the center section is doped periodically, with a dopant that changes the index of refraction, it will behave like a Bragg grating. Other well known methods for varying the index of refraction will also work. The waveguide 156 connects the sensor 164 to an edge 166 of the semiconductor chip 150.

Figure 10:
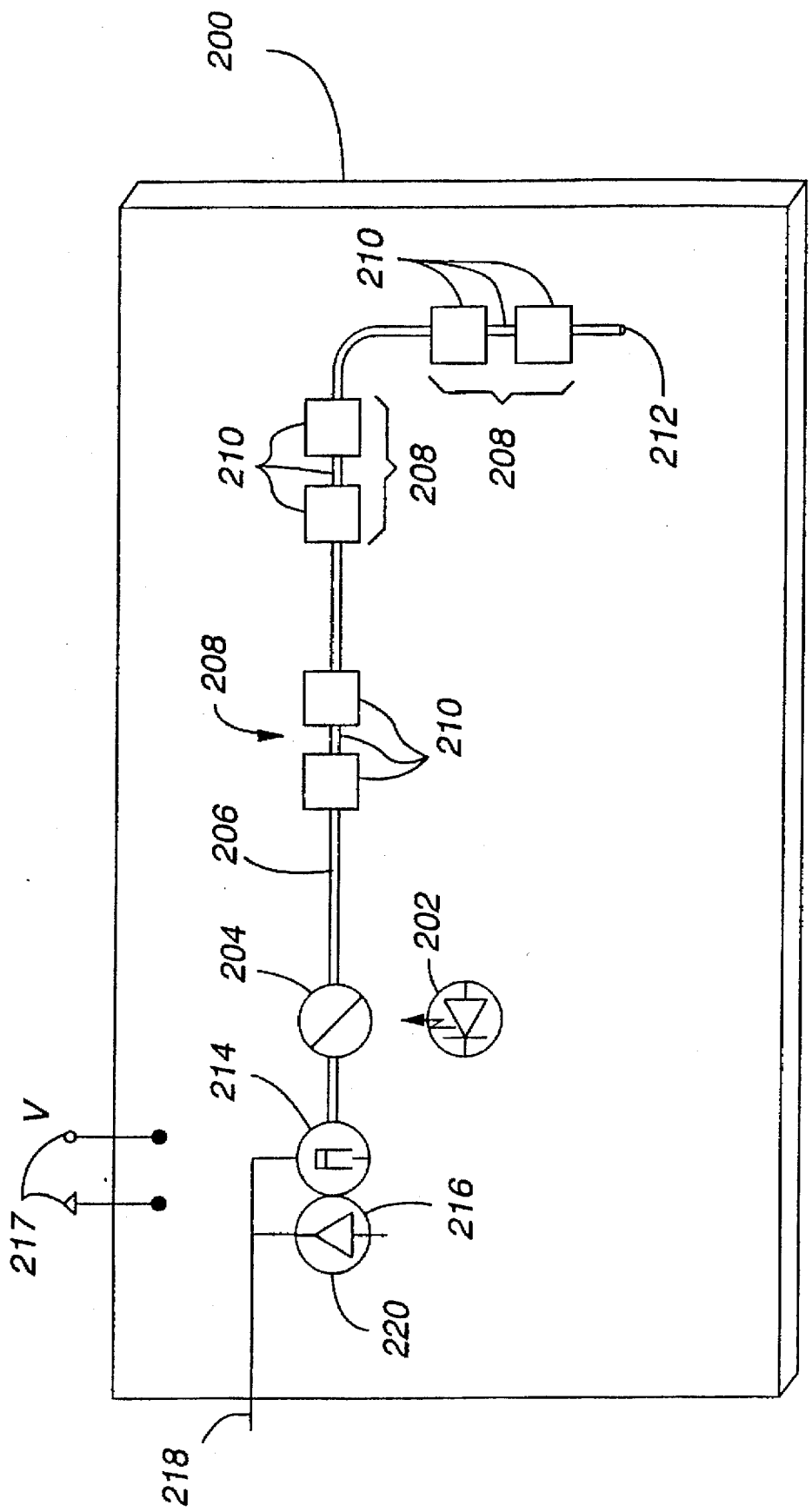
FIG. 10 is a schematic drawing of a strain measurement system on a semiconductor chip.

FIG. 10 shows a schematic drawing of the system of FIG. 7 on a semiconductor chip 200. A laser 202 is directed at a coupler 204 that guides the laser light into a waveguide 206. The waveguide 206 is connected to a plurality of strain sensors 208, composed of a plurality of interferometers 210. A terminator 212 is connected to the end of the waveguide 206. The coupler 204 directs the reflected light into a tunable Fabry-Perot etalon 214. A photodetector 216 detects any interference patterns. Leads 217 provide power to the circuit. The lead 218 allows control of the tunable Fabry-Perot etalon 214 and lead 220 provides the output voltage of the photodetector 216. A controller and a voltmeter can then be added to complete the system of FIG. 7.

Thus, there has been described a strain sensor and system that can measure both axial and non-axial strain. By sharing mirrors between the IFPI and the EFPI an energy efficient strain system has been designed. By adding a temperature sensor the strain measurements can be adjusted for the temperature induced strain.

While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claims is:

1. A strain sensor comprising:
   an intrinsic Fabry-Perot interferometer; and
   an extrinsic Fabry-Perot interferometer, coupled to the intrinsic Fabry-Perot interferometer.

2. The strain sensor of claim 1, wherein the intrinsic Fabry-Perot interferometer and the extrinsic Fabry-Perot interferometer share a mirror.

3. The strain sensor of claim 1, further including a second intrinsic Fabry-Perot interferometer, wherein the extrinsic Fabry-Perot interferometer is between the intrinsic Fabry-Perot interferometer and the second intrinsic Fabry-Perot interferometer.

4. The strain sensor of claim 3, wherein the extrinsic Fabry-Perot interferometer shares a mirror with the intrinsic Fabry-Perot interferometer.

5. The strain sensor of claim 4, wherein an optical path length of the extrinsic Fabry-Perot interferometer is different than an optical path length of the intrinsic Fabry-Perot Interferometer.

6. The strain sensor of claim 1, wherein the intrinsic Fabry-perot interferometer is replaced with a Bragg grating.

7. The strain sensor of claim 1, further including a temperature sensor.

8. The strain sensor of claim 1, wherein the intrinsic and extrinsic Fabry-Perot interferometers are formed on a semiconductor chip.

9. The strain sensor of claim 8, wherein the semiconductor chip has a waveguide formed in the semiconductor chip and the waveguide couples at least one of the extrinsic Fabry-Perot interferometer or intrinsic Fabry-Perot interferometer to an edge of the semiconductor chip.

10. The strain sensor of claim 8, wherein the intrinsic Fabry-Perot is replaced by a Bragg grating.

11. A strain measurement system, comprising:
    a light source;
    means for measuring an optical intensity;
    a waveguide coupled to the light source and the means for measuring;
    a strain sensor coupled to the waveguide, comprising:
      an intrinsic Fabry-Perot interferometer, and
      an extrinsic Fabry-Perot interferometer.

12. The strain measurement system of claim 11, wherein the means for measuring comprises:
    a photodetector; and
    a voltmeter coupled to the photodetector.

13. The strain measurement system of claim 12, wherein the means for measuring further includes a tunable Fabry-Perot etalon connected between the waveguide and the photodetector.

14. The strain measurement system of claim 11, wherein the waveguide is an optical fiber.

15. The strain measurement system of claim 11, wherein the strain sensor further includes a temperature sensor.

16. The strain measurement system of claim 12, wherein there are a plurality of the strain sensors coupled together by the waveguide.

17. The strain measurement system of claim 16, further including a terminator at an end of the waveguide.

18. The strain measurement system of claim 11, wherein the strain sensor is formed in a semiconductor chip.

19. The strain measurement system of claim 18, wherein the light source, waveguide and photodetector are formed on a semiconductor chip.

20. The strain measurement system of claim 11, wherein the intrinsic Fabry-Perot interferometer has an optical path length that is in a predetermined relationship to an optical path length of the extrinsic Fabry-Perot interferometer.

21. The strain measurement system of claim 11, wherein the intrinsic Fabry-Perot interferometer is between a pair of the extrinsic Fabry-Perot interferometers.

22. The strain measurement system of claim 21, wherein the intrinsic Fabry-Perot interferometer shares a mirror with one of the extrinsic Fabry-Perot interferometers.

23. The strain sensor of claim 11 wherein the intrinsic Fabry-Perot is replaced by a Bragg grating.

24. A strain sensor comprising:
    a Bragg grating; and
    an extrinsic Fabry-Perot interferometer, coupled to the Bragg grating.

25. The strain sensor of claim 24, wherein the extrinsic Fabry-Perot interferometer shares a surface with the Bragg grating.

26. The strain sensor of claim 24, further including a second extrinsic Fabry Perot interferometer.

* * * * *